(12) United States Patent
Inoue et al.

(10) Patent No.: US 7,537,811 B2
(45) Date of Patent: May 26, 2009

(54) LIQUID CRYSTAL DISPLAY DEVICE AND MANUFACTURING METHOD THEREFOR

(75) Inventors: Yuichi Inoue, Kawasaki (JP); Kengo Kanii, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 583 days.

(21) Appl. No.: 11/005,746

(22) Filed: Dec. 7, 2004

(65) Prior Publication Data
US 2005/0134790 A1 Jun. 23, 2005

(30) Foreign Application Priority Data
Dec. 15, 2003 (JP) ............... 2003-416180

(51) Int. Cl.
C09K 19/38 (2006.01)
C09K 19/52 (2006.01)
C09K 19/54 (2006.01)
G02F 1/1333 (2006.01)

(52) U.S. Cl. .............. 428/1.1; 428/1.3; 252/299.01; 252/299.5; 349/93; 349/183

(58) Field of Classification Search ............... 428/1.1, 428/1.3; 349/183, 93; 252/299.01, 299.5
See application file for complete search history.

(56) References Cited

U.S. PATENT DOCUMENTS 5,384,069 A * 1/1995 Yoshinaga et al. ..... 252/299.01
5,812,232 A * 9/1998 Shiroto et al. ............. 349/157
5,858,482 A * 1/1999 Ishiwata et al. ........... 428/1.53
5,899,550 A * 5/1999 Masaki ..................... 349/109
6,781,665 B2 * 8/2004 Nakanishi et al. ......... 349/183
6,894,742 B2 * 5/2005 Inoue et al. ................ 349/93
6,952,252 B2 * 10/2005 Nakanishi .................. 349/182
7,169,449 B2 * 1/2007 Nakanishi et al. .......... 428/1.3

FOREIGN PATENT DOCUMENTS

| JP | 2003-149647 | 5/2003 |
| JP | 2003-177418 | 6/2003 |
| JP | 2003-228050 | 8/2003 |
| JP | 2003-279995 | 10/2003 |
| JP | 2003-307720 | 10/2003 |

* cited by examiner

Primary Examiner—Shean C Wu
(74) Attorney, Agent, or Firm—Greer, Burns & Crain, Ltd.

(57) ABSTRACT

A liquid crystal display device is manufactured by placing a liquid crystal composition in the gap between two parallel substrates followed by polymerization to form a liquid crystal layer, wherein the liquid crystal composition comprises a free radical scavenger, no voltage is applied between the electrodes at an initial polymerization period, ultraviolet rays are irradiated at an intensity of 1 mW/cm$^2$ or less at an initial polymerization period, the liquid crystal composition is subjected, prior to the polymerization, to heat treatment at a temperature equal to or above the phase transition temperature of the used liquid crystal, or the liquid crystal composition is supplied dropwise onto a substrate and the substrates are bonded together in vacuum to place the liquid crystal composition into the gap between the substrates. A liquid crystal display device with no or little occurrence of display irregularities is provided.

23 Claims, 3 Drawing Sheets

LIQUID CRYSTAL DISPLAY DEVICE AND MANUFACTURING METHOD THEREFOR

BACKGROUND OF THE INVENTION

1. Field of the Invention

The present invention relates to improvement of the display of a liquid crystal device using a polymerizable material that can be polymerized by light, heat, or a combination thereof. Such liquid crystal display devices are used in notebook personal computers, TV sets, portable TV sets, monitors, projectors, etc.

2. Description of the Related Art

In recent years, with the emergence of MVA (Multi-domain Vertical Alignment), IPS (in-plane switching) and other technologies, the viewing-angle characteristics of liquid crystals have been greatly improved. However, with respect to brightness, liquid crystal displays are still inferior to CRTs, and improvements in brightness are desired. As means for improving brightness, increase in the numerical aperture of the liquid crystal panel, or increase in the brightness of the backlight are known among other methods.

In particular, control of the liquid crystal alignment is crucial to improvement of the numerical aperture. In general, as means of controlling the alignment of liquid crystals, the provision of protrusions, control of electrode slits, formation of a cured resin or other polymers that regulate the liquid crystal alignment and other similar methods are known. Of these, the formation of a cured resin or other polymers to regulate the liquid crystal alignment is the most promising for maximizing the numerical aperture.

In the technology to create this polymer, a composition comprising a polymerizable compound such as a monomer and oligomer as well as a liquid crystal is injected into the gap between two parallel substrates on which are formed a pair of electrodes, the polymerizable compound is polymerized by applying light (usually: ultraviolet) radiation or heat processing with a voltage applied to the liquid crystal, and as a result the liquid crystal molecules are endowed with a pretilt angle (see for example Japanese Unexamined Patent Application Publication No. 2003-149647, scope of claims). Cross-linking polymerization often contributes to this polymerization, and often the result is a cured resin having a structure in which all or a portion of the polymer molecules are cross-linked.

However, this technology has the problem that display irregularities occur, as shown in FIG. 1. FIG. 1 is a schematic diagram as seen from the direction of observation of the screen of a liquid crystal panel 1. In the halftone display of FIG. 1, the most screen portion 3 of the liquid crystal display panel 1 displays normal halftones, but in the left-hand portion 4 of FIG. 1 the display is whitish. This portion 4 appears on the side opposite to the side of the panel screen where an injection aperture 2 used to inject the liquid crystal into the liquid crystal panel 1 is located.

SUMMARY OF THE INVENTION

The object of the present invention is to solve the above problem and to provide a liquid crystal display device that does not show or hardly shows display irregularities.

According to one aspect of the present invention, a manufacturing method of a liquid crystal display device is provided in which a liquid crystal composition comprising a liquid crystal and a polymerizable material that can be polymerized by light, heat, or a combination thereof is placed into the gap between two parallel substrates on which are formed a pair of electrodes, the polymerizable material is then polymerized to form an alignment polymer layer, and in which the liquid crystal composition comprises a free radical scavenger at a concentration of 1 ppm by weight or greater, and equal to or less than that of the polymerizable material on the weight basis.

It is preferable that the free radical scavenger be an antioxidant, and that the free radical scavenger be a phenolic antioxidant.

According to another aspect of the present invention, a manufacturing method of a liquid crystal display device is provided in which a liquid crystal composition comprising a liquid crystal and a polymerizable material that can be polymerized by light, heat, or a combination thereof is placed into the gap between two parallel substrates on which are formed a pair of electrodes, the polymerizable material is then polymerized to form an alignment polymer layer, and in which the polymerizable material is caused to undergo polymerization in a state in which a voltage is not applied between the electrodes at least in the initial stage of polymerization, after which the polymerizable material is caused to undergo polymerization in a state in which a voltage is applied between the electrodes.

According to another aspect of the present invention, a manufacturing method of a liquid crystal display device is provided in which a liquid crystal composition comprising a liquid crystal and a polymerizable material that can be polymerized by light, heat, or a combination thereof is placed into the gap between two parallel substrates on which are formed a pair of electrodes, the polymerizable material is then polymerized to form an alignment polymer layer, and in which irradiation with ultraviolet rays is performed at least in the initial stage of polymerization at an ultraviolet ray intensity of 1 mW/cm$^2$ or less. It is preferable that, after irradiation with ultraviolet rays at the ultraviolet ray intensity of 1 mW/cm$^2$ or less, irradiation with ultraviolet rays be performed at an ultraviolet ray intensity higher than 1 mW/cm$^2$.

According to another aspect of the present invention, a manufacturing method of a liquid crystal display device is provided in which a liquid crystal composition comprising a liquid crystal and a polymerizable material that can be polymerized by light, heat, or a combination thereof is placed into the gap between two parallel substrates on which are formed a pair of electrodes, the polymerizable material is then polymerized to form an alignment polymer layer, and in which the liquid crystal composition is heat-treated at a temperature equal to or higher than the phase transition temperature of the liquid crystal in the liquid crystal composition from the liquid crystal state to the isotropic state, and then, after lowering the temperature to below the phase transition temperature, the liquid crystal composition is caused to undergo polymerization. It is preferable that the heat treatment at or above the phase transition point be performed for one hour or longer.

According to another aspect of the present invention, a manufacturing method of a liquid crystal display device is provided in which a liquid crystal composition comprising a liquid crystal and a polymerizable material that can be polymerized by light, heat, or a combination thereof is placed into the gap between two parallel substrates on which are formed a pair of electrodes, the polymerizable material is then polymerized to form a liquid crystal layer, and in which the liquid crystal composition is supplied dropwise, in the form of a plurality of droplets, onto at least one of the substrates, which is then bonded to the other substrate in vacuum so that the liquid crystal composition is placed into the gap between the substrates.

Each of the above aspects of the present invention can be implemented in combinations as far as they do not oppose the gist of the present invention.

As a liquid crystal used, it is preferable that a liquid crystal with a negative dielectric constant anisotropy be used.

According to still another aspect of the present invention, a liquid crystal display device manufactured by the manufacturing method of a liquid crystal display device described above is provided.

By means of the present invention, a liquid crystal display device with no occurrence of display irregularities, or in which such irregularities do not readily occur, is provided.

DESCRIPTION OF THE PREFERRED EMBODIMENTS

Below, embodiments of the present invention are explained using figures, embodiments etc. These figures, embodiments, etc. as well as explanations illustrate the present invention, but do not limit the scope of the invention. It goes without saying that other embodiments conforming to the gist of the invention can also fall within the scope of the present invention.

The origin of the above-described display irregularities is surmised to be as follows. The above composition is injected into the gap between two parallel substrates on which are formed a pair of electrodes, During the injection, impurities existing within or on the surface of a layer part that is on the surface of the parallel substrates, and is in contact with the composition, are flushed further into the side opposite to the injection aperture side in the panel. As a result, in the portion 4, the concentration of impurities in the above composition rises, and these impurities are incorporated through polymerization, giving rise to irregularities in the composition of the resulting polymers, so that the tilt angle varies with location.

More specifically, an alignment control film is a common example of the layer part that is on the surface of the parallel substrates and in contact with the composition. In general, a polyimide or polyamic acid films are used for the alignment control film.

Figure 2:
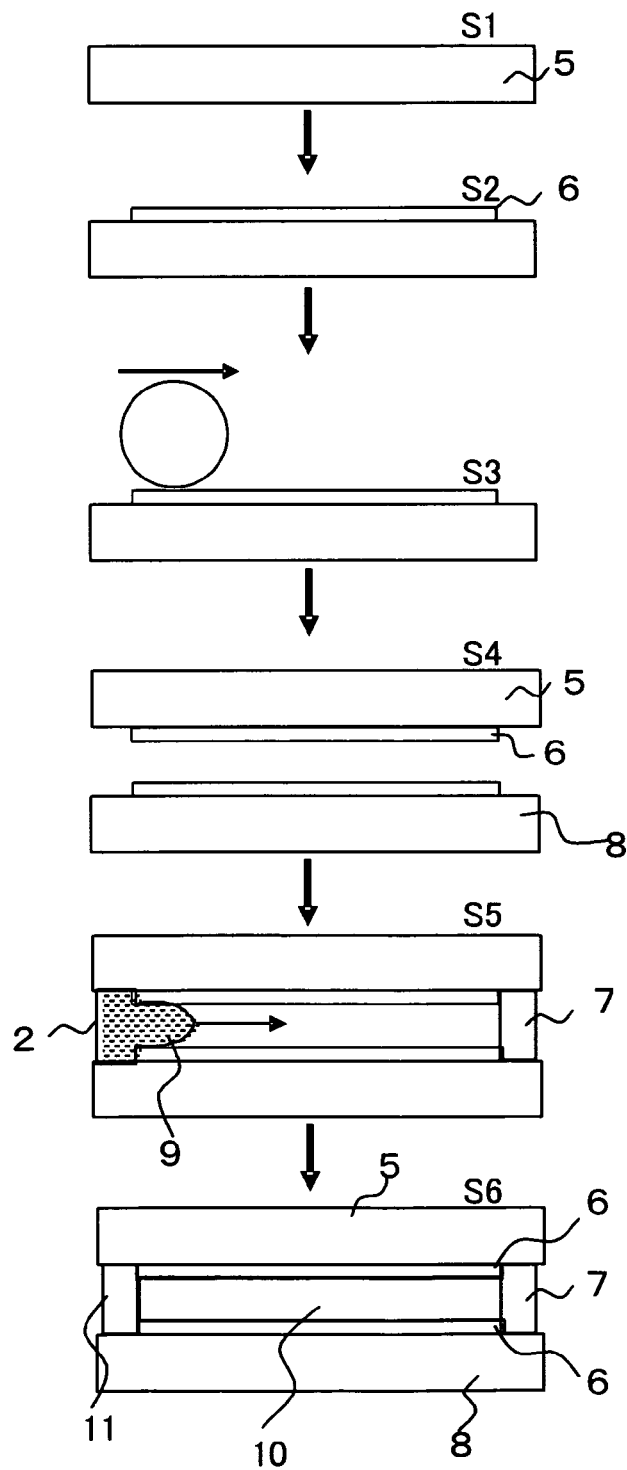
FIG. 2 is a schematic diagram showing an example of the flow of manufacture of a liquid crystal panel.

FIG. 2 is a schematic diagram showing the flow of manufacture of a liquid crystal panel 1. From the top to the bottom of FIG. 2, first in step S1 a substrate 5 on which no alignment control film is applied is prepared, and in step S2 a polyimide or other alignment control film 6 is formed on the substrate 5. Then, in step S3 rubbing or similar substrate treatment is performed as necessary, and in step S4 the substrate is bonded with another substrate 8. In step S5, a liquid crystal composition 9 is introduced from the injection aperture 2, and in step S6 the injection aperture is sealed. Then, the polymerizable compound in the liquid crystal composition (hereafter, a polymerizable compound in the liquid crystal composition may simply be called a polymerizable compound) is caused to polymerize by means of heat, light or similar, to fabricate a liquid crystal display panel. The liquid crystal layer 10 is enclosed by the substrates 5 and 8, the sealant 7, and the sealing material 11.

Figure 3:
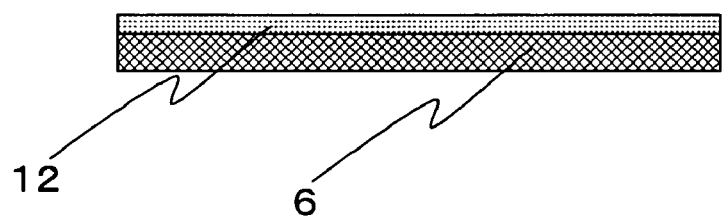
FIG. 3 is a (partial) schematic horizontal cross-sectional view of a liquid crystal panel; and, FIG. 4 is a (partial) schematic plane view of a liquid crystal panel.
Figure 4:
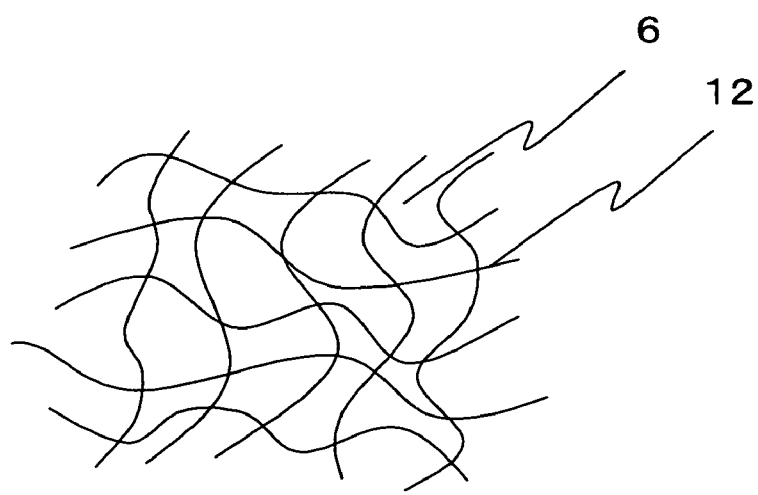

It is thought that when this polymerizable compound undergoes polymerization, it gathers on the alignment control film 6 as shown in FIG. 3 and FIG. 4, forming a kind of layer 12, and that the liquid crystal molecules assume a pretilt angle due to an interaction with this layer 12. It is to be noted that FIG. 3 is a schematic horizontal cross-sectional (partial) view of a liquid crystal panel, and FIG. 4 is a plane view of same.

Figure 1:
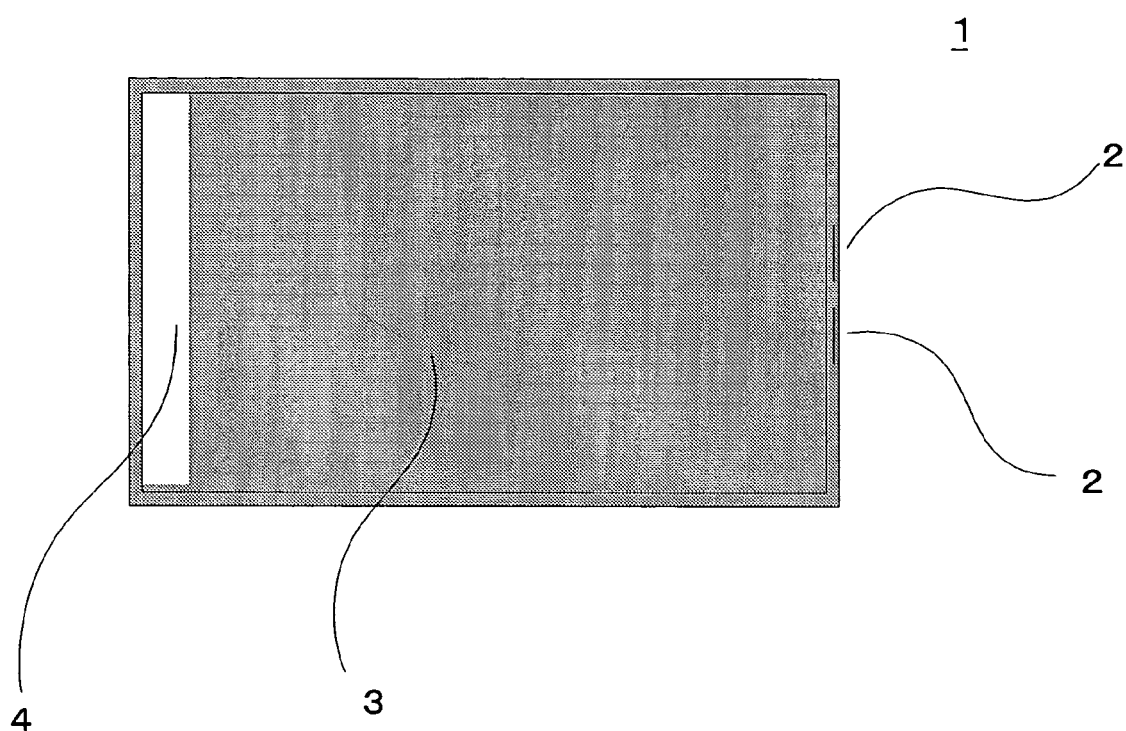
FIG. 1 is a schematic diagram seen from a direction of observation of the screen of a liquid crystal panel.

Upon injection of this liquid crystal composition, impurities within and on the surface of the alignment control film accumulate in the portion 4 in FIG. 1, and these impurities are incorporated into polymers so that the composition of the polymers formed differ from the composition of the polymers in the portion 3, resulting in different pretilt angles manifested.

As the result of studies to eliminate display irregularities, undertaken from the perspective of such irregularities in the composition of polymers, it was discovered, in a manufacturing method of a liquid crystal display device in which a liquid crystal composition comprising a liquid crystal and a polymerizable material which can be polymerized by light, heat or a combination thereof is disposed in the gap between two parallel substrates on which are formed a pair of electrodes, after which polymerization of the polymerizable material is caused and the pretilt angle of liquid crystal layer is induced, that rendering the impurities harmless, or performing polymerization under conditions such that impurities have no affect on or do not easily affect the alignment of liquid crystals, or ensuring that impurities are not unevenly distributed in the liquid crystal composition, are effective.

In the methods below, so long as there is no contradiction with the gist of the respective methods, any well-known polymerizing method may be adopted for polymerization of the polymerizable material, and either light or heat, or a combination thereof, can be used in accordance with the properties of the polymerizable material used. As light, it is preferable that ultraviolet rays be used. The wavelength range of the ultraviolet rays may be selected appropriately.

From the perspective of inducing pretilt in a liquid crystal, normally a voltage is applied between the electrodes during some of the periods of polymerization. There is no need to hold constant the intensity of the light or applied voltage or the heating temperature. If the intensity or temperature is gradually increased, in some cases the time for manufacture of the liquid crystal display device may be shortened.

(1) Method using a free radical scavenger

From the perspective of rendering impurities harmless, it is effective to have the liquid crystal composition comprise a free radical scavenger.

It is thought that impurities are often incorporated as free radicals during polymerization of a polymerizable compound. Moreover, it is thought that the polymerizing activities of free radicals are higher than those of polymerizable compounds. It is thought that if a free radical scavenger is incorporated into the liquid crystal composition, the impurities lose their radical polymerizing activity, and as a result, there is no or little inclusion in polymerization of the polymerizable compound. A free radical scavenger can act as a polymerization inhibitor, and too much amount of such material present may impede polymerization itself of the polymerizable compound. It is preferable that the concentration of the free radical scavenger be greater than or equal to 1 ppm by weight in the liquid crystal composition, and be equal to or less than the concentration of the polymerizable material on the weight basis. At a concentration of greater than 1 ppm by weight, the effect in rendering impurities inactive is sufficient. When the concentration on the weight basis is greater than that of the polymerizable material, polymerization of the polymerizable compound would itself be impeded.

As a free radical scavenger, any material that does not contradict the gist of the present invention may be used, and can be selected as appropriate on the basis of specific advantages; in general, however, antioxidants are preferable. Examples of antioxidants include phenolics, aromatic amines (strongly colored in some cases), etc. In particular, phenolic antioxidants are preferable. Specific examples include Irganox 1076, Irganox 1010, Irganox 1141, etc. which are phenolic antioxidants manufactured by Ciba Specialty Chemicals.

(2) Method of polymerizing a polymerizable compound without applying a voltage across electrodes From the perspective of causing polymerization under conditions in which impurities do not affect or do not readily affect the alignment of a liquid crystal, it is effective to perform polymerization with no voltage applied between the electrodes initially, and then to perform polymerization with a voltage applied between the electrodes. Polymerization can be performed using either light or heat, or a combination thereof; it is preferable that light, and in particular ultraviolet rays, be used.

Polymerization with applying a voltage is needed at the second step. But, another step of irradiation (=third step) may be undergone without applying voltage after the second step.

This last irradiation without applying voltage after making pretilt angle is not limited for this embodiment.

The reason for this is surmised to be as follows. In a state in which no voltage is applied to the polymerizable compound, when for example ultraviolet radiation is applied, impurities also undergo reactions by being incorporated into polymerization of the polymerizable compound; but because no voltage is applied, monomers undergo polymerization without appearance of a liquid crystal pretilt angle. When this processing is continued, the impurities are consumed and used up first as a result of preferential polymerization, since the polymerization activities of the impurities are higher than that of the polymerizable compound. Then, when polymerization is performed while a voltage is applied, polymers comprising only polymerizable compounds without any impurities, are formed, and the liquid crystal can be endowed with a uniform pretilt angle.

(3) Method of suppressing the ultraviolet ray intensity at least for the initial period of polymerization When the ultraviolet intensity is held low at least during the initial polymerization period, display irregularities can also be prevented.

The reason is surmised that due to the fact that the above-described polymerization activity of impurities is higher than the polymerization activity of the polymerizable compound in the liquid crystal composition, so that polymerization of impurities is preferred in a state of low ultraviolet intensity, the impurities are consumed first, and when the ultraviolet intensity is then raised and the polymerizable compound is caused to undergo polymerization, impurities are no longer incorporated into polymers, and so no longer have an effect on the liquid crystal pretilt angle. However, it is not necessary to examine whether in fact impurities have not been incorporated into the polymers, and it is sufficient to select conditions such that display irregularities can be prevented.

The low level of ultraviolet intensity can be set appropriately on the basis of experiments or similar. It was ascertained that an intensity of 1 mW/cm$^2$ or less is preferable. This level need not be constant, and may be changed. The intensity may be increased gradually. When heat-induced polymerization is also possible, combination with heating may be employed. Depending on the type of a polymerizable compound, the ultraviolet intensity may be 0 (zero) mW/cm$^2$ as well.

Thereafter, polymerization is continued with the ultraviolet intensity raised appropriately. In general, from the standpoint of productivity, it is preferable that the ultraviolet intensity be raised to an appropriate level to perform polymerization. After the period in which the ultraviolet intensity is held low, it is preferable that polymerization of the polymerizable material be performed at an ultraviolet intensity higher than 1 mW/cm$^2$.

The period over which the ultraviolet intensity is held low can be set arbitrarily. For example, the end-point may be set according to the concentration of the unreacted polymerizable compound in the liquid crystal composition, or according to some other parameter. The wavelength region of the ultraviolet rays used can also be set arbitrarily, but it is preferable that wavelengths be 400 nm or shorter.

During the period in which the ultraviolet intensity is held low, either a state in which a voltage is applied between the electrodes or a state in which no voltage is applied between the electrodes may be employed; but a state in which a voltage is applied between the electrodes can shorten the processing time under these conditions, and so is often advantageous.

(4) Method of performing heat treatment at a temperature equal to or above the phase transition point from liquid crystal state to isotropic state From the perspective of preventing impurities from being distributed non-uniformly in the liquid crystal composition, it is useful, after placing the liquid crystal composition between the substrates, to perform heat treatment at a temperature equal to or above the phase transition point from the liquid crystal state (for example, the nematic state) to the isotropic state (which hereafter may be simply called the "phase transition point") for the liquid crystal used, and then after cooling to below the phase transition point to perform polymerization of the liquid crystal composition.

By performing heat treatment at a temperature equal to or above the phase transition point prior to inducing polymerization, impurities can be diffused throughout the liquid crystal composition. If heat treatment is performed until the impurity concentration in the liquid crystal composition is for example substantially uniform, followed by lowering the temperature below the phase transition point and then starting polymerization of the polymerizable compound, the concentration of the impurities in the polymer can be made uniform, so that the effect of impurities on the pretilt angle can also be made uniform, even if a reaction occurs between impurities and the polymerizable compound, and it should be possible to eliminate the problem of display irregularities.

In this method, when performing heat treatment at a temperature equal to or above the phase transition temperature, it is important that this heat does not cause polymerization sufficient to impede the diffusion of impurities into the liquid crystal composition. The temperature equal to or above the phase transition point can be selected and set arbitrarily according to actual conditions. The time over which the temperature equal to or above the phase transition point should be maintained can also be set arbitrarily according to actual conditions, but it is preferable that the time be 1 hour or longer.

(5) Method of dropwise supply of the liquid crystal composition

In placing the liquid crystal composition between the substrates, it was ascertained a method of placing the liquid crystal composition between the substrates in which a plurality of droplets of the liquid crystal composition are supplied dropwise onto at least one of the substrates, and the substrates are then bonded together in vacuum, is also effective.

When the liquid crystal composition is introduced between the substrates in this way, flushing of the impurities to cause accumulation in one portion can be prevented. It is preferable that the plurality of droplets are placed as uniformly as possible to the substrate surface so that non-uniformity of the amount of liquid does not occur when bonding the substrates together. Specifically, it is preferable that the distance between droplets be made uniform, and that the amount of each drop also be made uniform. Any well-known method may be used to supply the droplets in this way.

All of the above-described methods (1) through (5) can be used in combination, as long as they conform to the objectives of the present invention and no technical problems arise.

For example, method (1) may be combined with method (2) or with method (3). There may be cases in which advantages can be obtained; for example, it may be possible to reduce the content of the free radical scavenger, or in other respects it may be possible to relax the overall conditions or shorten the time required for processing.

Method (1) renders impurities harmless, while method (4) and method (5) render uniform the concentration of impurities in the liquid crystal composition; there are many cases in which sufficient results can be obtained from any one of these separately, but there may also be cases in which more reliable effects are obtained, if combined.

The conditions used in each of the above methods (1) through (5) and combinations thereof, such as for example the type and concentration of free radical scavenger in method (1), the time over which a voltage is not applied between the electrodes in method (2), the ultraviolet intensity in the initial polymerization period in method (3), the heat treatment temperature and time in method (4), and the specific method of formation of droplets in method (5), can be determined through experiments or by other means according to the specific effects thereof, such as for example whether display irregularities such as those in FIG. 1 occur or not.

A liquid crystal display device having a liquid crystal display panel fabricated as described above such as shown in step S6 of FIG. 2, has no or only few display irregularities, and can present satisfactory display. A liquid crystal display panel of the present invention can be utilized by adding a driving device or similar, or most typically can be utilized as a liquid crystal display device for a personal computer display or a television receiver. However it goes without saying that it can also be employed in other applications requiring functions for control of the transmission of a light beam by the action of a liquid crystal. Examples include liquid crystal shutters, liquid crystal projectors, photochromic glasses and displays for portable information terminals.

Any well-known liquid crystals can be employed as the liquid crystal of the present invention so long as there is no contradiction with the objectives of the present invention. Of course liquid crystals with positive dielectric constant anisotropy as well as liquid crystals with negative dielectric constant anisotropy can be employed. However, because of the ease of a multi-domain designing (broad-viewing-angle) for the rubbing-less orientation of liquid crystals, it is preferable that liquid crystals with a negative dielectric constant anisotropy be used.

Also, any well-known polymerizable compounds can be employed, so long as there is no contradiction with the objectives of the present invention. In general, compounds can be selected from among those compounds known as monomers and oligomers. Examples include acrylic esters, methacrylic esters, and other compounds having functional groups such as acrylate groups, methacrylate groups, epoxy groups, vinyl groups, allyl groups, and similar.

A polymerizable compound or compounds may comprise a single component or a plurality of components. In general, a polymerizable compound consisting of or comprising cross-linkable components is preferable. Examples of cross-linkable components are those having in a molecule a plurality of acrylate groups, methacrylate groups, epoxy groups, vinyl groups, allyl groups, and other polymerizable double-bond groups, and having a structural component capable of polymerizing with other molecules through the action of ultraviolet radiation or other light or heat. One of more specific examples is diacrylate monomer.

Embodiments

Next, examples for embodiment of the present invention and comparative examples are explained in detail; however, the present invention is not limited to these examples.

COMPARATIVE EXAMPLE 1

A liquid crystal panel was fabricated as shown in FIG. 2, using the following materials and polymerization method.

0.5 parts by weight of an acrylate monomer having two acrylate groups in a molecule were added to 100 parts by weight of a liquid crystal with a negative dielectric constant anisotropy ($\Delta\in$) of −3.8 for forming a liquid crystal composition. The phase transition point from liquid crystal state to isotropic state of this liquid crystal was 70° C.

This liquid crystal composition was injected by vacuum suction, with the injection aperture on the bottom, into the gap between parallel substrates with the cell thickness held at 4 μm using spacers. Then, while applying 10 V across the electrodes, ultraviolet rays at a wavelength of 365 nm were irradiated at an ultraviolet intensity of 20 mW/cm$^2$ for a sum of approximately 10 J/cm$^2$ to endow the liquid crystal with a pretilt angle.

Polyimide alignment control films of thickness 100 nm were provided in advance on the parallel substrates used.

As a result, display irregularities such as shown in FIG. 1 appeared on this liquid crystal panel during halftone display.

EXAMPLE 1

Regarding method (1)

A liquid crystal panel was fabricated as for Comparative Example, except for the addition of 0.005 parts by weight of an antioxidant (Irganox 1076 produced by Ciba Specialty Chemicals (octadecyl-3-(3,5-di-tert-butyl-4-hydroxyphenyl) propionate)) for the liquid crystal composition.

As a result, display irregularities such as shown in FIG. 1 did not occur in this liquid crystal panel during halftone display.

EXAMPLE 2

Regarding method (2)

No antioxidant was used, and a two-stage process was employed wherein ultraviolet irradiation for a sum of 1 J/cm$^2$ was performed with no initial voltage application and then, while applying a voltage of 10 V, irradiation was performed for approximately 9 J/cm$^2$. Other than this, the liquid crystal panel was fabricated similarly to the method of Example 1.

As a result, display irregularities such as shown in FIG. 1 did not occur in this liquid crystal panel during halftone display.

EXAMPLE 3

Regarding method (3)

No antioxidant was used, and a two-stage method was employed in which ultraviolet radiation was performed initially with a 10 V voltage applied at 0.5 mW/cm$^2$ for a sum of 4 J/cm$^2$, and then with the voltage still applied but at 10 mW/cm$^2$ for a sum of approximately 6 J/cm$^2$. Other than this, the method employed to fabricate the liquid crystal panel was similar to that of Example 1.

As a result, display irregularities such as shown in FIG. 1 did not occur in this liquid crystal panel during halftone display.

EXAMPLE 4

Regarding method (4)

No antioxidant was used, and in a state in which neither ultraviolet irradiation nor voltage was applied, the panel was heat-treated (annealed) at 100° C. for 10 hours, then cooled to room temperature followed by applying a voltage and ultraviolet irradiation. Other than this, the method employed to fabricate the liquid crystal panel was similar to that of Example 1.

As a result, display irregularities such as shown in FIG. 1 did not occur in this liquid crystal panel during halftone display.

EXAMPLE 5

Regarding method (5)

No antioxidant was used, and the liquid crystal composition was supplied dropwise onto one of the substrates of the panel to form droplet spots having a diameter of approximately 1 cm with the centers spaced at substantially equal intervals of approximately 3 cm. Then bonding with the other substrate was performed in vacuum, after which voltage application and ultraviolet irradiation were performed. Other than this, the method employed to fabricate the liquid crystal panel was similar to that of Example 1.

As a result, display irregularities such as shown in FIG. 1 did not occur in this liquid crystal panel during halftone display.

What is claimed is:

1. A manufacturing method of a liquid crystal display device, wherein a liquid crystal composition comprising a liquid crystal and a polymerizable material which can be polymerized by light, heat, or a combination thereof, is placed into the gap between two parallel substrates on which are formed a pair of electrodes, and the polymerizable material is then polymerized to form a liquid crystal layer; wherein:
   the liquid crystal composition comprises a free radical scavenger at a concentration of 1 ppm by weight or greater, and equal to or less than that of the polymerizable material on the weight basis, and
   a liquid crystal with a negative dielectric constant anisotropy is employed as said liquid crystal.

2. The manufacturing method of a liquid crystal display device according to claim 1, wherein said free radical scavenger is an antioxidant.

3. The manufacturing method of a liquid crystal display device according to claim 2, wherein said free radical scavenger is a phenolic antioxidant.

4. A manufacturing method of a liquid crystal display device, wherein a liquid crystal composition comprising a liquid crystal and a polymerizable material which can be polymerized by light, heat, or a combination thereof, is placed into the gap between two parallel substrates on which are formed a pair of electrodes, and the polymerizable material is then polymerized to form a liquid crystal layer; wherein:
   at least during the initial polymerization period, the polymerizable material is polymerized in a state in which a voltage is not applied between the electrodes, and then, the polymerizable material is polymerized in a state in which a voltage is applied between the electrodes, and
   a liquid crystal with a negative dielectric constant anisotropy is employed as said liquid crystal.

5. A manufacturing method of a liquid crystal display device, wherein a liquid crystal composition comprising a liquid crystal and a polymerizable material which can be polymerized by light, heat, or a combination thereof, is placed into the gap between two parallel substrates on which are formed a pair of electrodes, and the polymerizable material is then polymerized to form a liquid crystal layer; wherein:
   at least during the initial polymerization period, ultraviolet rays are irradiated at an intensity of 1 mW/cm$^2$ or less, and
   after the ultraviolet irradiation at an intensity of 1 mW/cm$^2$ or less, ultraviolet rays are irradiated at an intensity above 1 mW/cm$^2$.

6. A manufacturing method of a liquid crystal display device, wherein a liquid crystal composition comprising a liquid crystal and a polymerizable material that can be polymerized by light, heat, or a combination thereof, is placed into the gap between two parallel substrates on which are formed a pair of electrodes, and the polymerizable material is then polymerized to form a liquid crystal layer; wherein:
   the liquid crystal composition is subjected to heat treatment at a temperature equal to or above the phase transition temperature of the liquid crystal in the liquid crystal composition from the liquid crystal state to the isotropic state,
   and then, after lowering the temperature to below the phase transition temperature, the liquid crystal composition is polymerized, and
   further wherein, at least during the initial polymerization period, ultraviolet rays are irradiated at an intensity of 1 mW/cm$^2$ or less, and after the ultraviolet irradiation at an intensity of 1 mW/cm$^2$ or less, ultraviolet rays are irradiated at an intensity above 1 mW/cm$^2$.

7. The manufacturing method of a liquid crystal display device according to claim 6, wherein said heat treatment at or above the phase transition temperature is performed for 1 hour or longer.

8. A manufacturing method of a liquid crystal display device, wherein a liquid crystal composition comprising a liquid crystal and a polymerizable material that can be polymerized by light, heat, or a combination thereof, is placed into the gap between two parallel substrates on which are formed a pair of electrodes, and the polymerizable material is then polymerized to form a liquid crystal layer; wherein:
   the liquid crystal composition is supplied dropwise as a plurality of droplets onto at least one of the substrates, and the substrates are then bonded together in vacuum to place the liquid crystal composition into the gap between the substrates, and a liquid crystal with a negative dielectric constant anisotropy is employed as said liquid crystal.

9. The manufacturing method of a liquid crystal display device according to claim 4, wherein:

the liquid crystal composition comprises a free radical scavenger at a concentration of 1 ppm by weight or greater, and equal to or less than that of the polymerizable material on the weight basis.

10. The manufacturing method of a liquid crystal display device according to claim 9, wherein said free radical scavenger is an antioxidant.

11. The manufacturing method of a liquid crystal display device according to claim 10, wherein said free radical scavenger is a phenolic antioxidant.

12. The manufacturing method of a liquid crystal display device according to claim 5, wherein:

at least during the initial polymerization period, the polymerizable material is polymerized in a state in which a voltage is not applied between the electrodes, and then; the polymerizable material is polymerized in a state in which a voltage is applied between the electrodes.

13. The manufacturing method of a liquid crystal display device according to claim 8, wherein:

the liquid crystal composition is subjected to heat treatment at a temperature equal to or above the phase transition temperature of the liquid crystal in the liquid crystal composition from the liquid crystal state to the isotropic state, and then;

after lowering the temperature to below the phase transition temperature, the liquid crystal composition is polymerized.

14. The manufacturing method of a liquid crystal display device according to claim 13, wherein said heat treatment at or above the phase transition temperature is performed for 1 hour or longer.

15. A liquid crystal display device manufactured by the manufacturing method of a liquid crystal display device according to claim 1.

16. The manufacturing method of a liquid crystal display device according to claim 5, wherein:

the liquid crystal composition comprises a free radical scavenger at a concentration of 1 ppm by weight or greater, and equal to or less than that of the polymerizable material on the weight basis.

17. The manufacturing method of a liquid crystal display device according to claim 6, wherein:

the liquid crystal composition comprises a free radical scavenger at a concentration of 1 ppm by weight or greater, and equal to or less than that of the polymerizable material on the weight basis.

18. The manufacturing method of a liquid crystal display device according to claim 8, wherein:

the liquid crystal composition comprises a free radical scavenger at a concentration of 1 ppm by weight or greater, and equal to or less than that of the polymerizable material on the weight basis.

19. The manufacturing method of a liquid crystal display device according to claim 6, wherein:

at least during the initial polymerization period, the polymerizable material is polymerized in a state in which a voltage is not applied between the electrodes, and then; the polymerizable material is polymerized in a state in which a voltage is applied between the electrodes.

20. The manufacturing method of a liquid crystal display device according to claim 8, wherein:

at least during the initial polymerization period, the polymerizable material is polymerized in a state in which a voltage is not applied between the electrodes, and then; the polymerizable material is polymerized in a state in which a voltage is applied between the electrodes.

21. The manufacturing method of a liquid crystal display device according to claim 8, wherein:

at least during the initial polymerization period, ultraviolet rays are irradiated at an intensity of 1 mW/cm$^2$ or less.

22. A manufacturing method of a liquid crystal display device, wherein a liquid crystal composition comprising a liquid crystal and a polymerizable material which can be polymerized by light, heat, or a combination thereof, is placed into the gap between two parallel substrates on which are formed a pair of electrodes, and the polymerizable material is then polymerized to form a liquid crystal layer; wherein:

at least during the initial polymerization period, ultraviolet rays are irradiated at an intensity of 1 mW/cm$^2$ or less, and further wherein a liquid crystal with a negative dielectric constant anisotropy is employed as said liquid crystal.

23. A manufacturing method of a liquid crystal display device, wherein a liquid crystal composition comprising a liquid crystal and a polymerizable material that can be polymerized by light, heat, or a combination thereof, is placed into the gap between two parallel substrates on which are formed a pair of electrodes, and the polymerizable material is then polymerized to form a liquid crystal layer; wherein:

the liquid crystal composition is subjected to heat treatment at a temperature equal to or above the phase transition temperature of the liquid crystal in the liquid crystal composition from the liquid crystal state to the isotropic state, and then, after lowering the temperature to below the phase transition temperature, the liquid crystal composition is polymerized, and further wherein a liquid crystal with a negative dielectric constant anisotropy is employed as said liquid crystal.

* * * * *